Patented June 20, 1933

1,914,425

UNITED STATES PATENT OFFICE

FRIEDRICH AUGUST HENGLEIN, OF COLOGNE-DEUTZ, AND FRIEDRICH WILHELM STAUF, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS OF DEHYDRATING FLUORINE COMPOUNDS

No Drawing. Application filed May 1, 1931, Serial No. 534,446, and in Germany May 16, 1930.

The present invention relates to a process of dehydrating fluorine compounds, especially hydrogen fluoride and salts of hydrofluoric acid, and consists in treating water containing fluorine compounds with fluorine.

For many industrial purposes anhydrous hydrogen fluoride and anhydrous fluorides are necessary. For instance, for the manufacture of fluorine fused alkali metal di- or polyfluorides are subjected to electrolysis while continuously adding anhydrous hydrogen fluoride. In the said electrolysis it is necessary that the starting materials employed are completely anhydrous, since otherwise the electrolysis fails. Hitherto the alkali di- or polyfluorides had to be dehydrated by continued drying for several days which was a very cumbersome procedure.

According to the present invention completely anhydrous hydrogen fluoride and fluorides are obtained by reacting upon water containing hydrofluoric acid or fluorides with fluorine. The fluorine decomposes any water present in the compounds to be dehydrated while forming hydrofluoric acid and oxygen or ozone.

For performing the reaction gaseous fluorine is passed through hydrofluoric acid or through molten fluorides or also through layers of solid fluorides. The reaction may be performed at normal temperature as well as at a higher temperature, for instance, at the melting point of the fluorides.

The invention is illustrated by the following examples without being restricted thereto.

Example 1

84 grams of fluorine are passed into one liter of 96% hydrofluoric acid. After completion of the experiment water can no longer be detected.

Example 2

100 grams of potassium difluoride, containing 1% of water are treated with fluorine gas. After an hour the water is completely decomposed and the electrolysis can be successfully proceeded with.

We claim:—
1. Process of preparing anhydrous fluorine compounds comprising reacting upon a compound of the group consisting of hydrofluoric acid and fluorides which contain water with fluorine.
2. Process of preparing anhydrous hydrogen fluoride comprising reacting upon hydrofluoric acid containing water with fluorine.
3. Process of preparing anhydrous fluorides comprising reacting upon a fluoride containing water with fluorine.
4. Process of preparing anhydrous alkali metal fluoride comprising reacting upon an alkali metal fluoride containing water with fluorine.

In testimony whereof, we affix our signatures.

FRIEDRICH AUGUST HENGLEIN.
FRIEDRICH WILHELM STAUF.